Patented July 16, 1929.

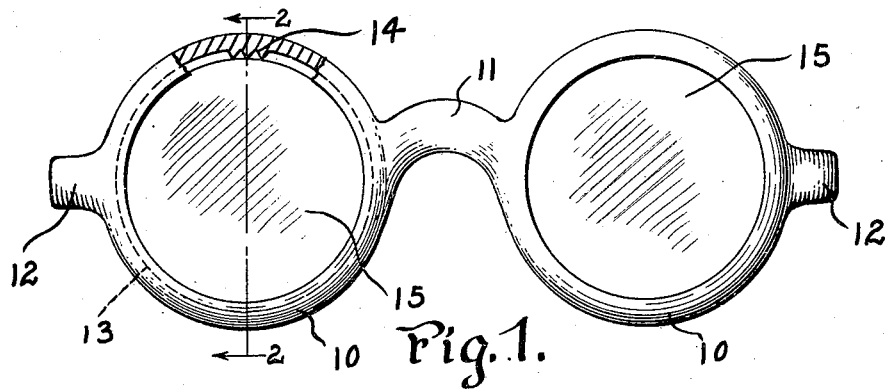

1,721,170

UNITED STATES PATENT OFFICE.

WILLIAM J. WRIGHTON, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

Application filed April 23, 1925. Serial No. 25,261.

This invention relates to improvements in ophthalmic mountings, and has particular reference to the mounting of circular lenses in spectacle and eyeglass frames.

In the correction of defective vision a great many people require lenses which have at least one surface ground to a cylindrical or toric curve, the axis of which is entirely dependent upon the individual optical conditions. In the use of such glasses it is very important that their axes should be correctly positioned with relation to the eyes of the wearer and positively maintained in that relationship. At the present time a great many people demand circular shaped lenses and frames and in such cases, where the lenses are intended for astigmatic correction, it has been a difficult problem to mount the lenses in the frames in such a way that they will be incapable of rotation therein. A number of attempts have been made to provide a mounting of such a character but they have not been entirely successful due to difficulties in assembling parts, or excessive cost of production.

An important object of this invention is to provide an ophthalmic mounting wherein a circular lens may be securely held against rotation.

Another object is to provide such a device which will be invisible from the front of the finished article.

Another object is to provide such a device which will be particularly adapted to use in non-metallic frames, such as those made of zylonite, which are so much in vogue at the present time.

Another object is to provide such a device which will be simple in construction, strong and durable in service, easily assembled, and an improvement in the art.

With these and other objects in view, the invention resides in the novel features of construction, combination and arrangement of parts hereinafter set forth, illustrated in the accompanying drawings, and specifically pointed out in the appended claims.

In the drawings forming a part of this application,

Figure 1 is a front elevation of a spectacle frame embodying the invention;

Figure 2 is a sectional view on line 2—2 of Figure 1;

Figure 3 is a front elevation of the lens per se;

Figure 4 is an enlarged detail sectional view through the lens rim prior to the assembly of the lens therein;

Figure 5 is a similar view showing the lens in place.

In Figure 1, I have illustrated a spectacle frame which may be of any ordinary or preferred type, it comprising essentially a pair of lens receiving rims 10 which are joined together by the usual bridge member 11 and fitted at their outer sides with end pieces 12 for the connection of temples. The frame herein shown is preferably of non-metallic material, such as of a cellulose composition, although it is not necessarily limited to such material, since the invention is equally applicable to metallic frames.

The lens rims 10 are circular in shape and provided in their internal peripheries with lens receiving grooves 13. Secured in the bottom of the groove 13 at any desired point in the rim, is a compressible lens locking member 14 which is preferably formed from a block or small piece of zylonite and held in place by cementing or other suitable fastening means. Lenses 15 are mounted in the rims and disposed within the grooves 13, each lens having its periphery roughened as by the serrations 16 which are sharply formed, as best illustrated in Figure 3. The serrated portion 16 of the lens is adapted to be engaged by the lens holding member 14 to the extent that the sharp prongs formed by the serrations will dig into the zylonite block and securely interlock the lens in the rim, as best shown in Figures 1 and 5. The serrations 16 may be very easily formed as by filing or broaching, the principal requirement being that they should form relatively sharp teeth.

In assembling the device, as shown in Figure 1, the lens rim 10 is suitably softened as by heating and stretched upon a tapered mandrel until the internal diameter of the same is sufficient to allow of the insertion of the lens 15, and thereafter as the rim again cools it will shrink so as to bring the locking member 14 into engagement with the serrated edge 16 of the lens and securely interlock therewith.

In the case of a frame having the split end piece, of course, the lens rim will not require stretching as has been herein described, but in that event the lens may be readily inserted by loosening the end piece members and opening the same.

The block 14 which constitutes the lens locking member is sufficiently small to be entirely concealed within the groove 13 so that the locking means will not be visible when the frame is being worn. The structure is simple and economical to produce and is no more difficult to assemble than an ordinary frame which is not provided with locking means.

Obviously the invention is susceptible of modification and the right is herein reserved to make such changes as fall within the scope of the appended claims without departing from the spirit of the invention.

Having thus described my invention, I claim:

1. In combination with a non-metallic ophthalmic frame having a lens receiving groove, a compressible lens locking member formed from non-metallic material and cemented in the bottom of the groove and a lens having projecting edge serrations adapted to bite into the lens locking member to hold the lens against rotation in the groove.

2. In combination with a non-metallic ophthalmic frame having a lens receiving groove, a lens locking member formed from a block of zylonite cemented in the bottom of the groove and a lens having projecting edge serrations adapted to bite into the lens locking member to hold the lens against rotation in the groove.

3. In combination with an ophthalmic frame having a lens receiving groove, a lens locking member formed from a block of compressible material and positively secured in the bottom of the groove, and a lens having a projecting portion adapted to bite into the lens locking member to hold the lens against rotation in the groove.

WILLIAM J. WRIGHTON.